(12) United States Patent
Randall (10) Patent No.: US 10,618,360 B2
(45) Date of Patent: Apr. 14, 2020

(54) MODULAR TYRE LINER

(71) Applicant: Neil Randall, Leeton (AU)

(72) Inventor: Neil Randall, Leeton (AU)

( * ) Notice: Subject to any disclaimer, the term of this patent is extended or adjusted under 35 U.S.C. 154(b) by 0 days.

(21) Appl. No.: 16/063,632

(22) PCT Filed: Apr. 20, 2017

(86) PCT No.: PCT/AU2017/050356
§ 371 (c)(1),
(2) Date: Jun. 18, 2018

(87) PCT Pub. No.: WO2017/181235
PCT Pub. Date: Oct. 26, 2017

(65) Prior Publication Data
US 2018/0370298 A1    Dec. 27, 2018

(30) Foreign Application Priority Data

Apr. 21, 2016    (AU) ................................. 2016901490

(51) Int. Cl.
*B60C 19/12*    (2006.01)
*B60C 13/00*    (2006.01)
*B60C 9/14*    (2006.01)

(52) U.S. Cl.
CPC .......... *B60C 19/122* (2013.01); *B60C 13/002* (2013.01); *B60C 19/12* (2013.01); *B60C 19/125* (2013.01); *B60C 2009/145* (2013.01); *B60C 2200/12* (2013.01)

(58) Field of Classification Search
CPC ..... B60C 19/122; B60C 19/12; B60C 19/125; B60C 13/002; B60C 2009/145; B60C 2200/12
See application file for complete search history.

(56) References Cited

U.S. PATENT DOCUMENTS

| | | | |
|---|---|---|---|
| 585,418 | A | 6/1897 | Bagot |
| 967,704 | A | 8/1910 | Bailey et al. |
| 1,294,201 | A | 2/1919 | Tucker |
| 1,413,619 | A | 4/1922 | Sawicki |
| 1,608,990 | A | 11/1926 | Mott |
| 1,733,681 | A | 10/1929 | Israel |
| 9,212,019 | B2 * | 12/2015 | Frost ...................... B65H 45/12 |

OTHER PUBLICATIONS

International Search Report & Written Opinion dated May 25, 2017 from PCT Application No. PCT/AU2017/050356.

* cited by examiner

*Primary Examiner* — John C Hong
(74) *Attorney, Agent, or Firm* — Innovation Capital Law Group, LLP; Vic Lin (57) ABSTRACT

There is provided a piece for a modular tyre liner, the piece being planar and generally rectangular and cut to define: a key head and a key hole, the key head configured for insertion into an associated key hole of an adjacent piece for engagement in use to form a mechanical interlock with the adjacent piece and wherein the key head and a key hole are configured for allowing movement of the piece with respect to the adjacent piece along the length of the liner in use.

9 Claims, 7 Drawing Sheets

MODULAR TYRE LINER

FIELD OF THE INVENTION

This invention relates generally to tyre liners. More particularly, this invention relates to a modular tyre liner for pneumatic tyre puncture resistance.

The embodiments described herein have been described primarily with reference for use for bicycle tires but it should be appreciated that the modular liner need not necessarily be limited to this particular application and may additionally or alternatively be utilised for other applications, such as vehicle tyres and the like.

BACKGROUND OF THE INVENTION

Tyre liners are used today for pneumatic inner tube puncture resistance. Such liners generally comprise an elongate and flexible yet sufficiently resilient strip of plastic material which is inserted in a tyre to protect the inner pneumatic tube.

Such tyre liners are generally sold in excessive length which is then cut to size as is required for the particular tyre. As such, it is typical that up to 20% of the tyre liner is discarded during installation.

Furthermore, existing tyre liners operate on a barrier principle which relies in the relative density and integrity of the liner strip for puncture resistance.

However, such barrier-tyre liners are not able to prevent all types of punctures, especially from resilient foreign bodies such as hardened thorns and road debris.

As such, such prior art barrier-tyre liners often times resort to using a denser liner material. However such adversely hampers the performance characteristics of the tyre.

Other prior art solutions alternatively use tyre "goo/slime", being a highly viscous liquid injected into the inner pneumatic tube to seal any punctures from foreign bodies breaching the tyre liner barrier.

The present invention seeks to provide a tyre liner, which will overcome or substantially ameliorate at least some of the deficiencies of the prior art, or to at least provide an alternative.

It is to be understood that, if any prior art information is referred to herein, such reference does not constitute an admission that the information forms part of the common general knowledge in the art, in Australia or any other country.

SUMMARY OF THE DISCLOSURE

There is provided herein a modular liner for pneumatic tyre puncture resistance which we have found provides superior puncture resistance additionally on account of a shear-type action.

Specifically, the modular liner comprises a plurality of pieces which mechanically interlock together in a way that allows for movement between adjacent pieces.

As such, as the tyre rolls, a standing wave is created at the bottom of the tyre where adjacent pieces move with respect to each other.

Such creates a travelling shearing boundary between adjacent pieces which, on account of the relative movement, either prevents a foreign body from penetrating past the shearing boundary, or if it does, the foreign body is sheared by the scissor-type action across the shearing boundary, thereby breaking the foreign body up and/or depriving the distal end of the foreign body from a driving force.

In embodiments, the particular configuration of the modular pieces of the liner creates two adjacent shearing boundaries, effectively doubling the shear-type puncture resistance of the liner.

Furthermore, the overlaying of the pieces provides an arched cross-section lamination which we found has bounce-back resilience which further resists against the egress of foreign bodies.

Other aspects of the invention are also disclosed.

BRIEF DESCRIPTION OF THE DRAWINGS

Notwithstanding any other forms which may fall within the scope of the present invention, preferred embodiments of the disclosure will now be described, by way of example only, with reference to the accompanying drawings in which.

DESCRIPTION OF EMBODIMENTS

Figure 1:
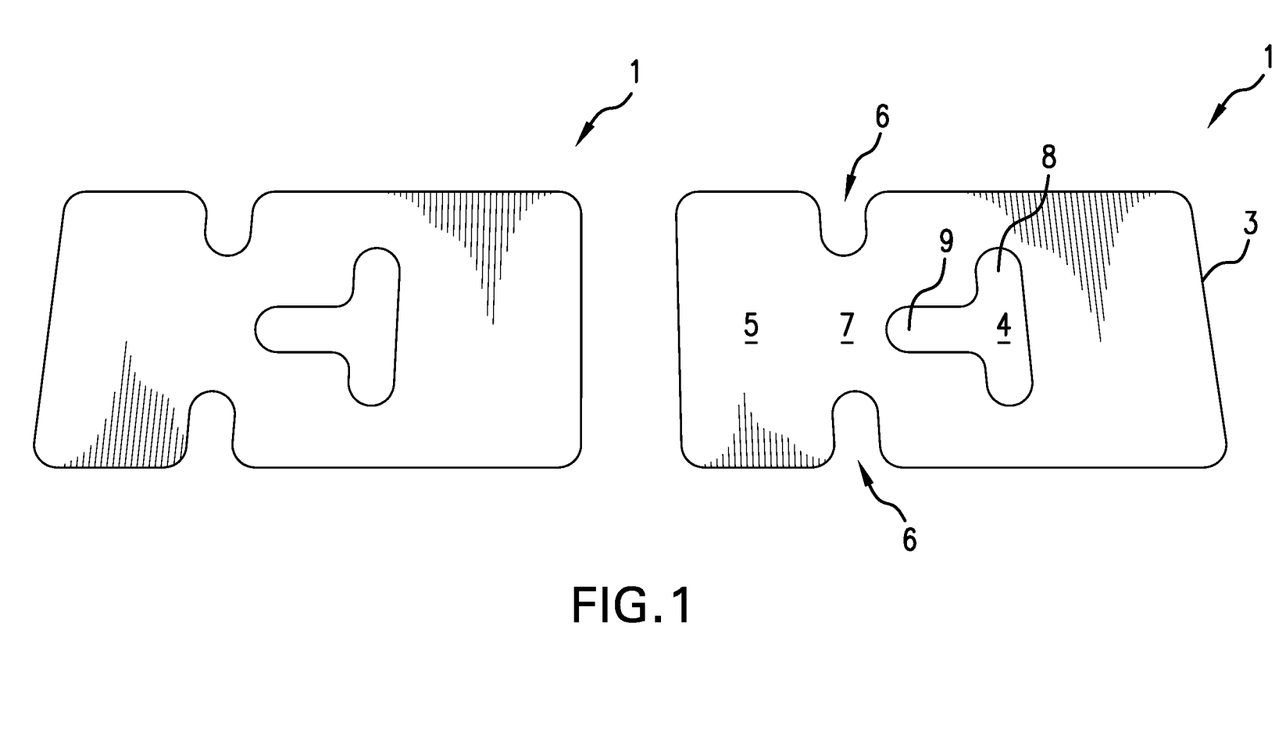
FIG. 1 shows two adjacent modular pieces for assembly of the liner in accordance with an embodiment.
Figure 3:
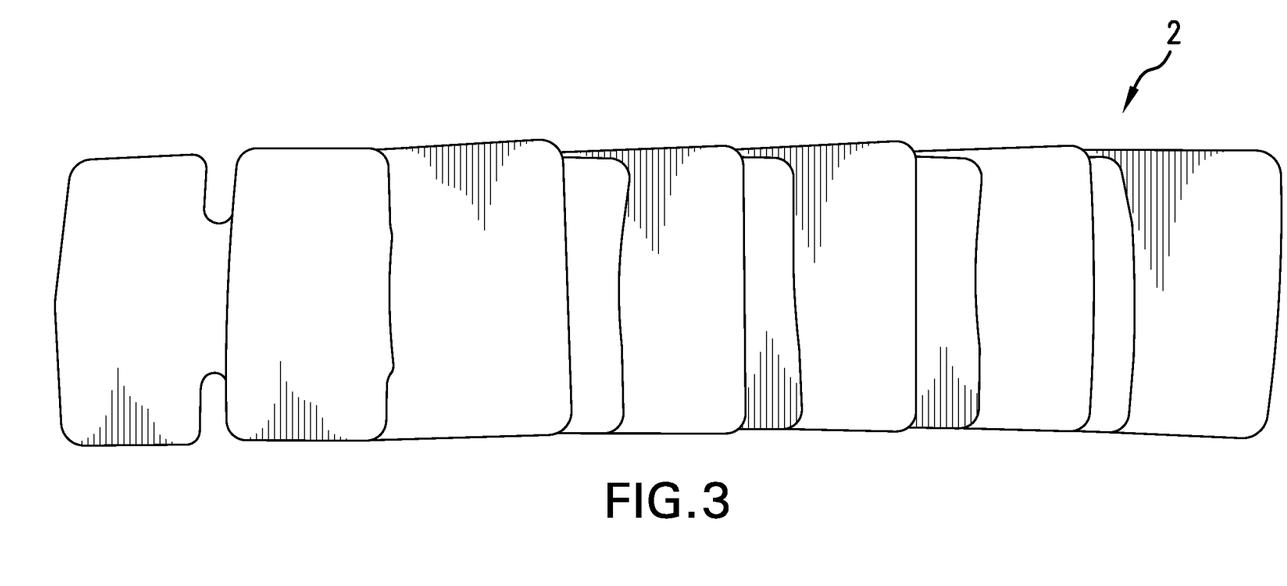
FIG. 3 shows an outer view of the assembled liner.
Figure 4A:
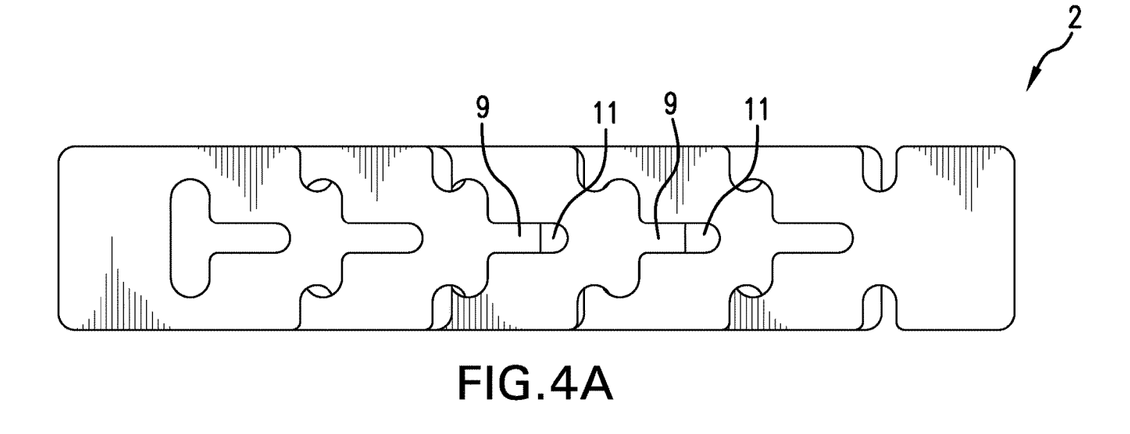
FIG. 4 shows inner views of the assembled liner.
Figure 4B:
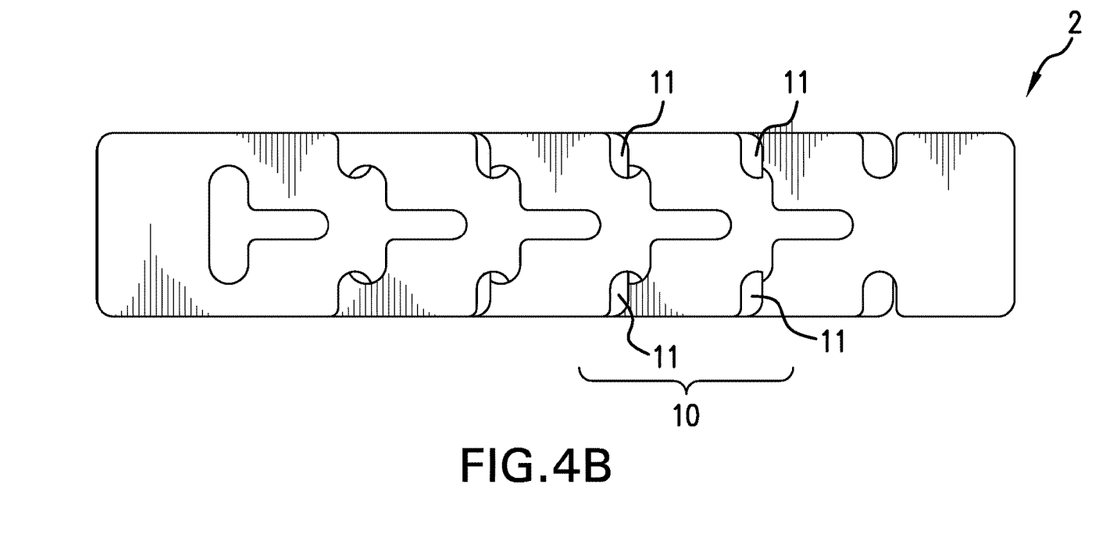
Figure 5:
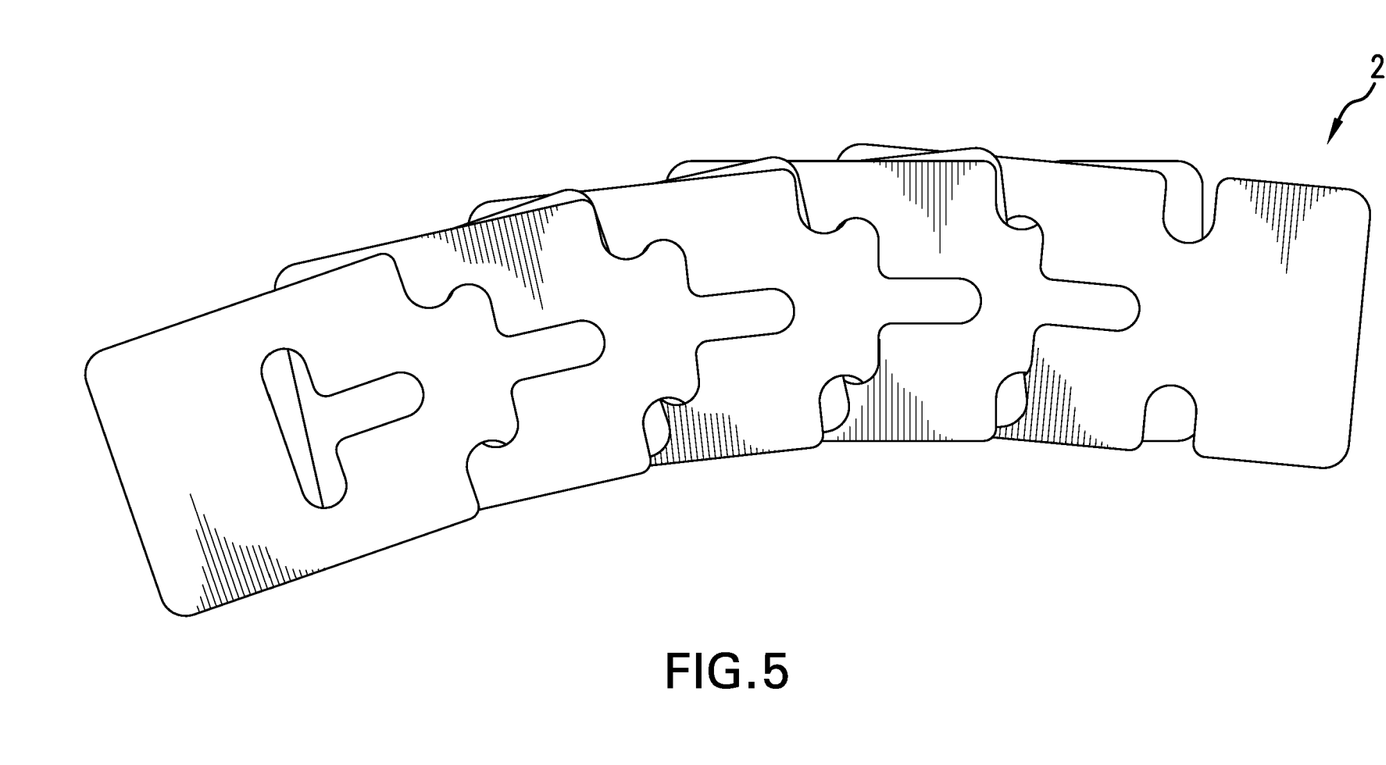
FIG. 5 illustrates the bendability of the assembled liner.

FIG. 1 shows a pair of adjacent modular pieces 1 for interlocking together to assemble a modular tyre liner 2 as is substantially shown in FIG. 3-5.

As can be seen, the piece 1 comprises a substantially planar body 3 which may have a substantially rectangular cross-section thereby defining an elongate axis.

Once assembled to form the modular tyre liner 2, each piece 1 bends about the elongate axis so as to conform to the substantially semicylindrical periphery of the inner pneumatic tube.

As is shown in FIG. 1, for mechanical interlocking, each piece 1 comprises a female-type keyhole 4 and a distal male-type key head 5.

Once assembled, the key head 5 mechanically interlocks with a respective keyhole 4 of an adjacent piece 1.

The key head 5 is defined by lateral opposite cutouts 6 cut from the edges of the piece 1. The cutouts 6 define a key neck 7 therebetween.

Relatedly, the keyhole 4 preferably comprises a t-shape cross-section defining a cross slot 8 and a lengthwise slot 9, and wherein the lengthwise slot 9 is orientated towards the key head 5.

As such, once assembled, the neck 7 locates within and across the cross slot 8 of the keyhole 4. In this regard, the neck 7 comprises a width less than that of the of the cross slot 8 so as to allow the neck 7 to fit within the cross slot 8. For example, the neck 7 may comprise a width of 20 mm and the cross slot 8 may comprise a width of 22 mm.

Figure 2:
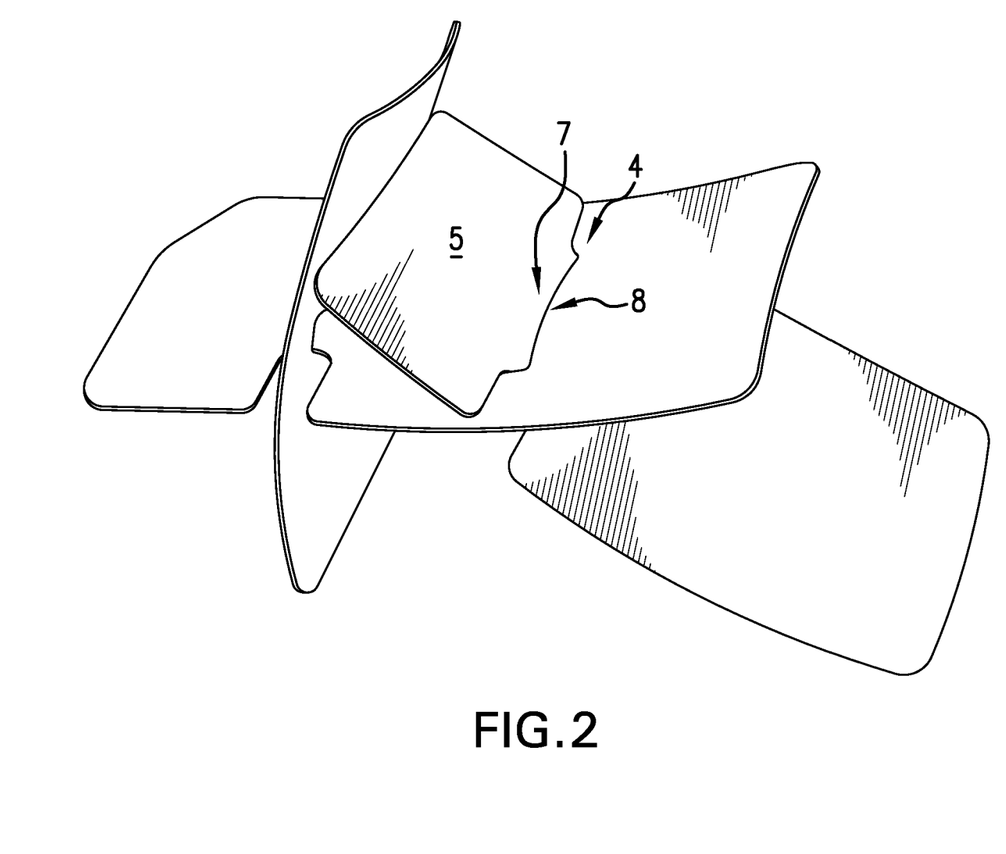
FIG. 2 shows the configuration of three interconnected modular pieces.

Specifically, turning to FIG. 2, there is shown the key head 5 having been inserted through the keyhole 4 such that the neck 7 locates within the cross slot 8.

Figure 6A:
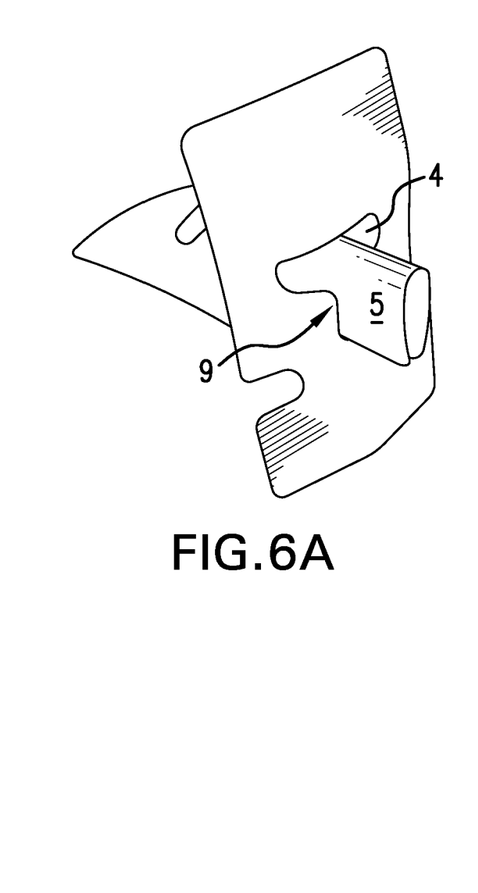
FIG. 6 shows the method for the interconnecting of adjacent modular pieces.

Furthermore, the lengthwise slot 9 is provided to facilitate insertion of the key head 5 through the keyhole 4. Specifically, as is shown in FIG. 6A, to mechanically interconnect two pieces 1, the key head 5 is bent in half along the lengthwise axis of the piece 1 so as to be able to be inserted through the lengthwise slot 9 of the keyhole 4 of the adjacent piece 1. As can be appreciated, the lateral cutouts 6 allow the bending of the key head 5 without having to bend the entire piece 1.

Figure 6B:
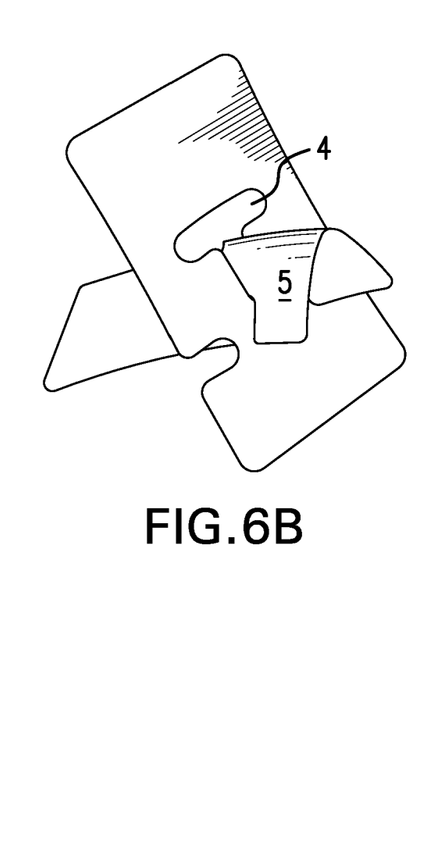

As is shown in FIG. 6B, once the key head 5 passes through the slot 4, the lateral edges of the key head 5 spring back into shape so as to allow the neck 7 to locate within the cross slot 8.

FIG. 4 shows the assembled tyre liner 1 comprising the constituent pieces 1. FIG. 4 shows the inner side view of the liner 1, being the side facing and contacting the pneumatic inner tube.

Conversely, FIG. 3 shows the outer side view of the assembled tyre liner 1 that is, the side facing and contacting the tyre.

Illustration of the travelling shearing boundary wave portion 10 is shown in FIG. 4.

As can be seen from FIG. 4B, at the shearing boundary wave portion 10, the adjacent pieces 1 move towards each other. Such is illustrated by edges 11 of the key heads 5 extending past the cutouts 6 of the adjacent piece 1.

However, after the travelling shearing boundary wave 10 has passed as is shown in FIG. 4A, and the adjacent pieces 1 move apart along the elongate axis with respect to each other. Such is illustrated in that the edges 11 of the key heads 5 no longer protruding via the cutouts 6 but are rather now partially exposed via the lengthwise slot 9.

As can be appreciated, the movement of the pieces 1 with respect to each other in this manner create a shearing action that assists in preventing a foreign body from breaching between adjacent pieces 1 or alternatively physically shearing the foreign body with a scissor-type action that do.

As can be appreciated from FIG. 2, the particular configuration of the modular pieces 1 (such as the location of the keyhole 4) in accordance with the preferred embodiment provides, at each location of the liner 2, three overlapping portions that provide two shearing boundaries which effectively doubles the shear-type puncture resistance of the liner 2.

Specifically, as can be seen from FIG. 2, the key head 5 is sandwiched between adjacent portions of the next two pieces 1 in series thereby creating the two shear boundaries adjacent the key head 5.

As can be best seen from FIG. 1, the breadth of the cross slot 8 is sufficient so as to allow the respective movement of adjacent pieces 1 when the neck 7 is engaged within the cross slot 8.

For example, the breadth of the cross slot 8 may be approximately 6 mm such that adjacent pieces 1 may move up to 6 mm with respect to each other.

As is further shown in FIG. 5, such may further allow the liner 2 to bend sideways.

In an embodiment, the piece 1 comprises a width of approximately 70 mm and a breadth of approximately 40 mm. Furthermore, the key head 5 may comprise a breadth of approximately 20 mm and the cutouts 6 may each comprise a breadth of approximately 6 mm and a width of substantially 10 mm.

Furthermore, the edge of the cross slot 8 away from the key head 5 may be located approximately 24 mm away from the adjacent edge and the end of the lengthwise slot 9 located approximately 28 mm away from the opposite end.

In a preferred embodiment, the pieces 1 are made from a substantially resilient deformable plastic material such as polypropylene sheeting. In embodiments, the pieces 1 are made from a thermoplastic material which were found to conform to the shape of the tyre.

Figure 7:
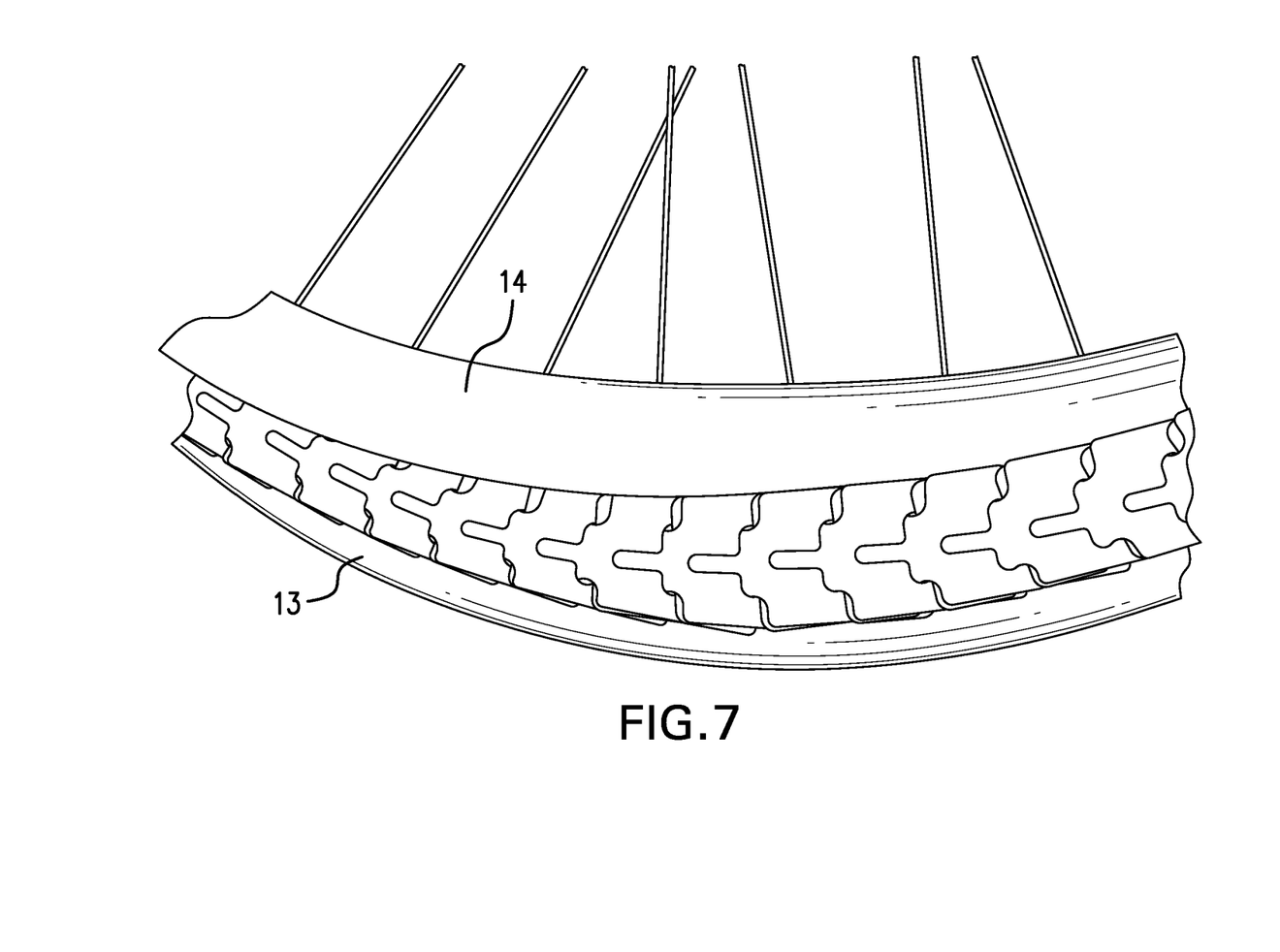
FIG. 7 shows the insertion of the assembled liner into a tyre.

As is shown in FIG. 7, once the liner 2 has been assembled in the manner described above, the liner 2 may be inserted between the outer tyre 13 and the inner pneumatic tube 14.

As can be appreciated from the foregoing, the modular liner 2 confers advantages in the manner in which set lengths may be constructed utilising an appropriate number of modular pieces so as to avoid material wastage.

Furthermore, as opposed to prior art liners which rely exclusively on the barrier method, the modular liner 2 utilises a shearing action to further enhance puncture resistance.

In accordance with one particular configuration described above, the overlapping portions of the pieces 1 may create two adjacent shear boundaries which double the shearing type puncture resistance of the liner 2.

The foregoing description, for purposes of explanation, used specific nomenclature to provide a thorough understanding of the invention. However, it will be apparent to one skilled in the art that specific details are not required in order to practice the invention. Thus, the foregoing descriptions of specific embodiments of the invention are presented for purposes of illustration and description. They are not intended to be exhaustive or to limit the invention to the precise forms disclosed; obviously, many modifications and variations are possible in view of the above teachings. The embodiments were chosen and described in order to best explain the principles of the invention and its practical applications, they thereby enable others skilled in the art to best utilize the invention and various embodiments with various modifications as are suited to the particular use contemplated. It is intended that the following claims and their equivalents define the scope of the invention.

The invention claimed is:

1. A modular inner tyre liner formed from a plurality of pieces, each piece comprising:
    a key head; and
    a key hole, the key hole having a T-shaped cross-section, the T-shaped cross-section having a lengthwise slot orientated toward the key head and a perpendicular cross slot, wherein
    the key head of a first piece of the plurality of pieces is configured for insertion into an associated key hole of a first adjacent piece of the plurality of pieces for engagement in use to form a mechanical interlock with the first adjacent piece;
    the key head and the key hole are configured for allowing movement of the first piece with respect to the first adjacent piece along a length of the liner;
    the first piece is configured for connection to the first adjacent piece by bending the key head of the first piece along an elongate axis thereof and by inserting the bent key head through the lengthwise slot of the first adjacent piece; and
    when the key head of the first piece is inserted into the key hole of the first adjacent piece, and the key head of the first adjacent piece is inserted into the key hole of a second adjacent piece of the plurality of pieces, the key head of the first piece is sandwiched between portions of the first adjacent piece and the second adjacent piece.

2. The modular inner tyre liner as claimed in claim 1, wherein the cross slot has a length orthogonal to the elongate axis of approximately 22 mm.

3. The modular inner tyre liner as claimed in claim 1, wherein the key head has a length along the elongate axis less than a length of the lengthwise slot along the elongate axis.

4. The modular inner tyre liner as claimed in claim 1, wherein the cross slot has a width along the elongate axis of approximately 6 mm.

5. The modular inner tyre liner as claimed in claim 1, wherein each of the plurality of pieces comprises a width of approximately 70 mm and a breadth of approximately 40 mm.

6. The modular inner tyre liner as claimed in claim 1, further comprising a key neck formed at a point along the elongate axis of each of the plurality of pieces formed by cutouts in from opposite side edges thereof, thereby dividing each of the plurality of pieces into the key head and an insertion tab section and an insertion section.

7. The modular inner tyre liner as claimed in claim 6, wherein the key neck has a length orthogonal to the elongate axis less than that of the cross slot.

8. The modular inner tyre liner as claimed in claim 7, wherein the length of the key neck is approximately 20 mm.

9. The modular inner tyre liner as claimed in claim 7, wherein the cross slot is spaced away from the key neck further than a length of the key head along the elongate axis.

\* \* \* \* \*